May 9, 1950            R. G. STILLINGER           2,507,124

TUBE TESTING DEVICE

Filed Oct. 1, 1945                                        2 Sheets-Sheet 1

Inventor: Ralph G. Stillinger

By his Attorney:

May 9, 1950 R. G. STILLINGER 2,507,124
TUBE TESTING DEVICE
Filed Oct. 1, 1945 2 Sheets-Sheet 2
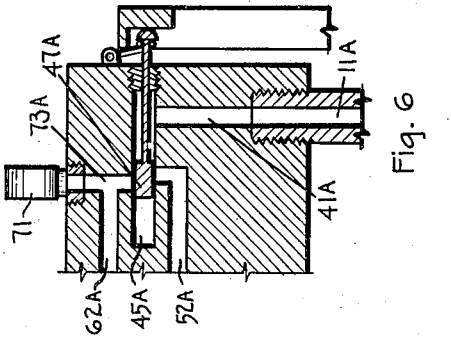
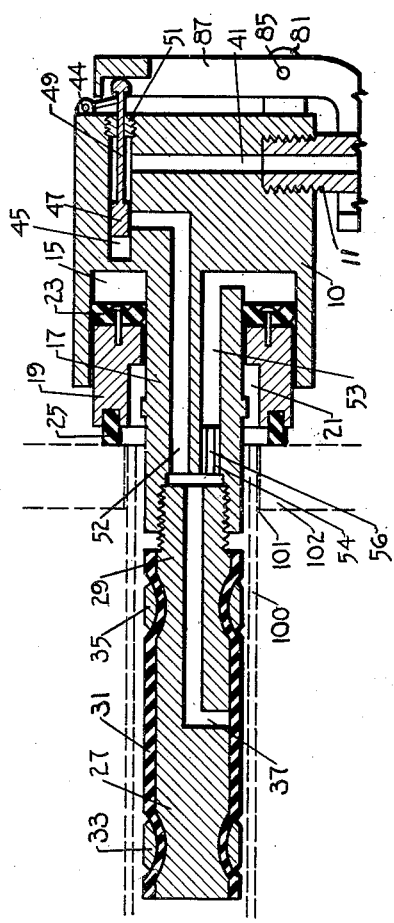
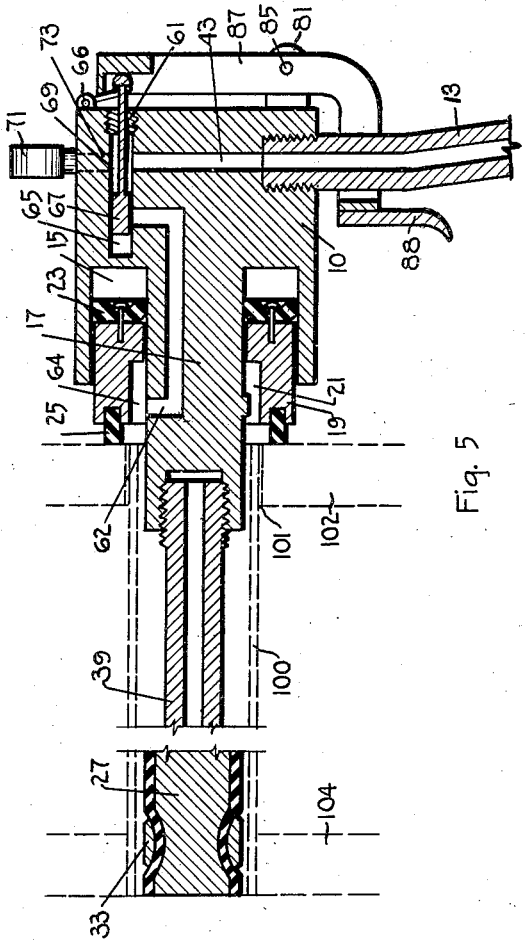
Inventor: Ralph G. Stillinger
By his Attorney:

Patented May 9, 1950

2,507,124

UNITED STATES PATENT OFFICE 2,507,124

TUBE TESTING DEVICE

Ralph G. Stillinger, Houston, Tex., assignor to Shell Development Company, San Francisco, Calif., a corporation of Delaware Application October 1, 1945, Serial No. 619,547

8 Claims. (Cl. 73—37)

This invention relates to an improved apparatus for testing tubular elements such as the tubes forming part of condenser, heat exchanger, still and similar installations.

In assembling tubular elements into tube bundles for use in condenser or heat exchanger shells, it is customary to insert the open ends of the tubes into metallic tube sheets or headers provided with suitable perforations, and to roll in or expand said tube ends in said perforations in a pressure tight manner. Because of imperfect rolling in or expansion of the tubes, of defective materials, of prolonged use, and of the difference of pressure existing in a tube shell between the inner space within the tube sheets and the outer space to which the orifices of the tubes are open, leaks are especially likely to develop at the points of such connection, that is, along the cylindrical surface of contact between the outer circumference of the end of each tube and the tube sheet into which it is expanded.

It is therefore an object of this invention to provide a simple testing device whereby tubes may be hydraulically tested for leaks or weaknesses without the use of complicated testing jigs.

It is further a particular object of this invention to provide a device for hydraulically testing tubes for leakage developing at points of connection of the tubes to the tube sheets or headers.

It is also an object of this invention to provide a system wherein one or more fluids under pressure are used for the purpose of actuating a testing device into an operative position and thereupon effecting the testing, said actuation and said testing being each effected in a proper time sequence controlled by means involving one or more valves and a plurality of pressure fluid passages, as herein described.

These and other objects of this invention will be understood from the following description taken with reference to the attached drawings wherein:

Fig. 4 is a vertical cross-section view of the present device taken along line 4—4 of Figure 3.

Fig. 5 is a vertical cross-section of the same device taken along line 5—5 of Figure 3, said device being however provided with a modified element 39 for insertion into the tubes under test.

Fig. 6 is a detail view in cross-section of a modification of the device of Figures 1–5.

Figure 2:
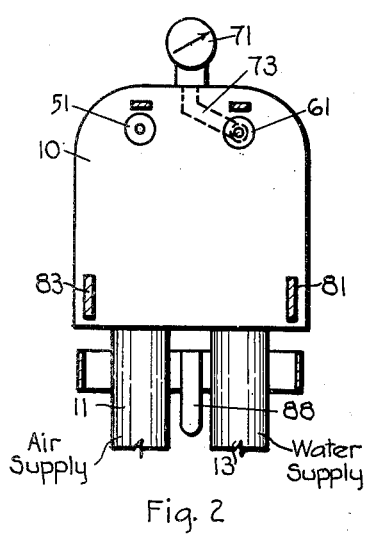
Fig. 2 is an end elevation view of the present device taken along a plane between the rear face of said device and the trigger attachment 87.

Referring to the drawings, the present device comprises a main or valve body 10, adapted to be suitably connected or attached to two pipes 11 and 13, shown in Fig. 2, of which one, 11, is connected to a supply of compressed air or gas, and the other, 13, to a supply of liquid or water under pressure. The body 10 may advantageously be of a semi-cylindrical shape and is provided on one side with a recess 15. A mandrel element 17 extends centrally of said recess and is either affixed to the valve body in any suitable manner, or is made integral therewith, as shown in the drawings. Mounted for sliding motion within the annular recess 15 between the outer walls of the body 10 and the mandrel 17 is an annular piston or plunger 19, which is counter-bored at its outer end, as shown at 21. The piston 19 is provided at its inner end with a pressure-tight annular packing or gasket element or cup 23, and has affixed to its outer end an elastic or resilient annular or ring element 25, made of a material such as natural or synthetic rubber, for example, neoprene.

The outer end of the mandrel 17 is provided with suitable screw-threads for engagement with a test plug element 27, connected thereto by a shank member, which may be either short as shown at 29 in Figure 4, or long, as shown at 39 in Figure 5, for purposes to be described hereinbelow.

The plug element 27 comprises a metallic cylinder enclosed in a resilient jacket or sleeve 31, held thereto by means of swaged rings 33 and 35. A channel or passage 37 serves to apply compressed air to the inner side of the sleeve, thus inflating it about the plug cylinder between the rings 33 and 35, as will be described hereinbelow.

Figure 1:
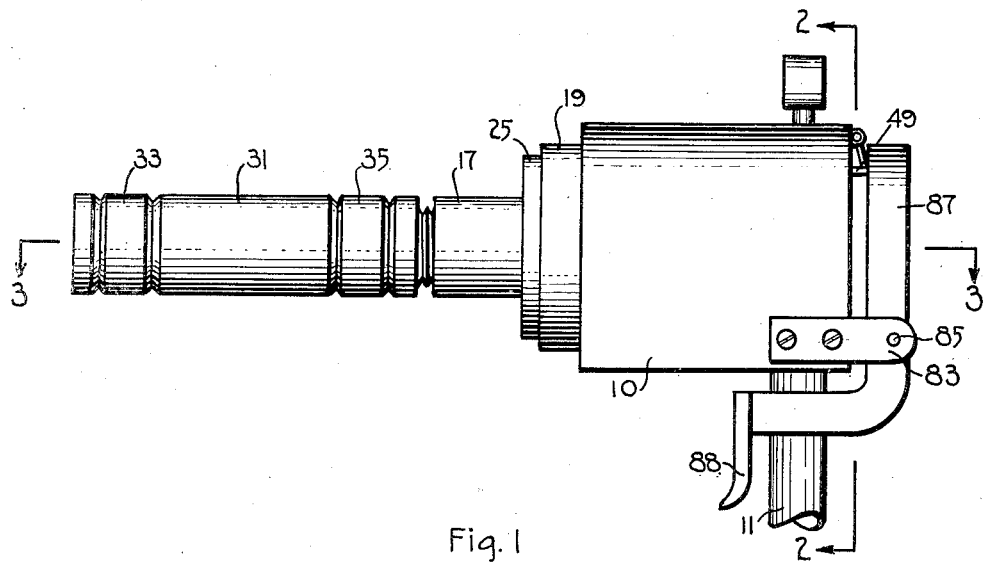
Fig. 1 is a side elevation view of the present device.
Figure 3:
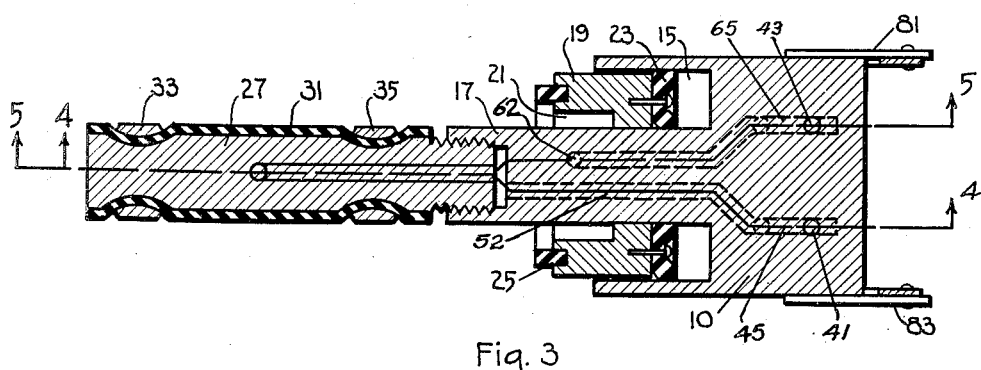
Fig. 3 is a horizontal cross-section view taken along line 3—3 of Fig. 1.

As shown in Figures 3 and 4, the compressed air supply pipe 11 is in communication through a channel or passage 41 in the body 10 with a valve chamber 45 holding a valve 47 having a stem 49 extending to the outside of the body 10 through a pressure tight plug or fitting 51. Upon being inwardly depressed, the valve 47 admits the compressed air to a passage 52, from which it is further applied, through passage 37, to the inner side of the sleeve 31 to inflate said sleeve, and also, through passage 53, to the inner side of the piston 19, causing said piston to move outwards.

As shown in Figures 3 and 5, the pressure water supply pipe 13 is in communication through a channel or passage 43 in the body 10 with a valve chamber 65 accommodating a valve 67 having a stem 69 and operating in a manner similar to that of valve 47 to establish communication between the passage 43 and a passage 62, whereby the pressure liquid may be delivered to the annular space 64 within the counterbored portion of the piston 19 or the resilient annular or ring element 25. The pressure of the liquid medium may be registered by means of an indicating device 71, exteriorly affixed to the body 10 and in communication with the valve chamber 65 by means of a passage 73, shown in dotted lines in Figure 5.

Exteriorly attached to the body member 10 are bars 81 and 83, which support, on pivots such as shown at 85, a bracket and trigger member 87. It will be seen that when the trigger 88 is depresed toward the handle formed by the pipes 11 and 13, the upper portion of the bracket 87 moves against the ends of the valve stems 49 and 69 and forces the valves open against the action of springs 44 and 66, normally tending to keep these valves in a closed position.

In operation, the present device is grasped in the manner of an air gun by the pipes 11 and 13 (which may, if desired, be connected together by means of clamps and/or provided with a wooden sheath or butt to provide a better grip), and the test plug element is inserted into the tube to be tested.

Referring to Figure 4, such a tube 100 is shown in dotted lines as being rolled in and expanded in a tube sheet 102. As stated above it is a common experience in using still, heat exchanger or condenser tube bundles that leakage develops at the point where tubes are connected to the tube sheets, that is, at a point generally indicated at 101.

With the test plug inserted into the tube, as shown in Figure 4, the trigger member 88 is actuated, forcing the valve stems 49 and 69 into the valve body 10.

The present device is arranged so that, for example, by making the body of the water valve 67 somewhat longer than the body of the air valve 47, the air valve opens first, admitting the compressed air to passages 52 and 37 and thus inflating the rubber sleeve 31 to form a pressure-tight seal within the tube 100. The compressed air from passage 52 enters also the passage 53, forcing the piston 19 outwards and pressing the resilient ring 25 firmly aginst the tube sheet 102 to form a circular fluid tight seal around the orifice of the tube 100. Since in order to obtain a tight seal, it is generally desirable that the ring 25 be pressed against the tube sheet 102 only after the plug 27 has been firmly anchored within the tube 100, means may be provided to delay the action of the piston 19; for example, a plug 54, having therethrough a considerably restricted bore 56, may be installed in the passage 53, whereby the compressed air is caused first to inflate the sleeve 31 and then to move the piston 19.

With the test plug 31 anchored within the tube and the ring 25 pressed around the orifice of said tube against the tube sheet, a further motion of the trigger 88 causes the water valve 67 to open, whereby the pressure liquid is admitted, through passage 62, to the annular space 64 within the piston 19 and ring 25. Since this space is sealed in pressure tight manner by the expanded sleeve 31 within the tube and the resilient seal ring 25 about the orifice of the tube, the only path provided for the escape of the pressure fluid is through the leak, if any, along the cylindrical surface of contact between the tube 100 and the tube sheet 102, as indicated at 101. If the connection between the tube and the tube sheet is faulty or leaky, some liquid will immediately appear at point 101, and the existence of a leak will be further indicated by a drop in the reading of the liquid pressure gage 71.

If desired, however, the present device may be used to test tubes for leaks not only at the header or tube sheet connections, but throughout their entire length. For this purpose, the test plug 27 may be connected to the valve body 10 by means of a shank 39 having a sufficient length to permit the test plug to be pushed as far as desired into the tube 100 for example, clear to the opposite header or tube sheet 104, as shown in Figure 5. The testing is then effected in the same manner as described above, any failure of the tube along its entire length being indicated by a drop of the liquid pressure gage 71.

Air pressures such for example as from about 100 to 200 lbs. per square inch, and liquid pressures from about 50 to 100 lbs. per square inch may be conveniently used in operating the present device.

Although, in the description hereinabove, reference was made, for illustration purposes, to a preferred embodiment of the present invention involving the use of two different pressure fluids controlled by two separate valves, it will be readily understood by those familiar with the art, that such control may equally well be achieved, through suitable changes in the organization of the pressure fluid passages and connections, by means of a single valve, and that furthermore a single fluid may be used for the purposes of operating the present device and testing the tubes for leaks. Thus, Figure 6 shows a somewhat modified embodiment of the present invention, wherein elements having functions corresponding to those of Figures 1–6 are indicated by the same numerals followed by the letter A.

It will be seen that in this embodiment a single pressure fluid, for example, compressed air, is supplied to the device by means of a single conduit 11A, and is further delivered through a passage 41A to a valve chamber 45A, wherein a single valve 47A upon being depressed by a trigger mechanism similar to that of Figures 1–6, operates to admit the pressure fluid, first to a passage 52A, thus inflating the packer 31 and forcing the packer 25 against the tube sheet 102, and, second, to a passage 62A thus admitting the pressure fluid to the space within the annular packer 25, any leakage from said space being indicated by the reading of the pressure gage 71 communicating with the valve chamber by means of a passage 73A.

I claim as my invention:

1. For use in testing tubes, a device comprising a body member, a mandrel extending from said body, expansible packer means mounted on said mandrel, there being an annular recess in said body member about said mandrel, an annular piston fitted about said mandrel for sliding motion in pressure-tight contact with said mandrel and the walls of said recess, annular packer means carried by said piston, there being valved passage means in said body for delivering a pressure fluid to said first packer and to the space in said recess behind said piston, and valved passage means for delivering a second pressure fluid to the space within said annular packer means, and conduit means adapted to be connected to said body for supplying a pressure fluid to each of said first and second valved passage means.

2. In a device for testing tubes, a valve body, a mandrel member extending from said body, expansible packer means mounted on said mandrel, there being an annular recess in said body around the mandrel, an annular piston fitted for sliding contact with the mandrel and the inner walls of the recess, an annular seal ring carried by said piston concentrically with the mandrel, there being a plurality of passage means through said body, said passage means opening respectively to the inside of said packer means, to the annular space within the recess behind the piston, and to the annular space within the seal ring, valve means in said passage means for controlling fluid flow therethrough, actuating means arranged exteriorly of said body for setting said valve means, and pressure fluid conduit means adapted to be connected to said body in register with said passage means.

3. For use in testing a tube having an end expanded in a tube sheet, a mandrel, a device comprising a radially expansible cylindrical packer on said mandrel adapted to be removably positioned in the tube, an annular piston packer coaxial with said cylindrical packer mounted about said mandrel for axial motion with regard to said cylindrical packer adapted to be positioned adjacent said tube sheet about the expanded end of the tube, means for applying a pressure fluid to the inside of the cylindrical packer, thereby expanding said packer to form a seal within said tube, means for applying a pressure fluid to one end of the piston packer, thereby forcing said piston packer axially towards the cylindrical packer against the tube sheet to form a seal about the expanded end of said tube, and means for applying a pressure fluid to the space confined by said two packer means.

4. The device according to claim 3 wherein the means for applying a pressure fluid to the inside of the cylindrical packer and the means for applying a pressure fluid to one end of the piston packer comprise a common pressure supply pipe, a valve for said supply pipe, and branched passageways from said valve to said cylindrical packer and to the end of the piston packer, respectively.

5. The device according to claim 4 wherein the branched passageway connecting the valve to the end of the piston packer is provided with a constriction, whereby pressure fluid admitted through said valve acts to expand said cylindrical packer before forcing said piston packer toward the cylindrical packer.

6. The device according to claim 3 wherein the means for applying a pressure fluid to the inside of the cylindrical packer and the means for applying a pressure fluid to one end of the piston packer comprise means for applying pressure fluid first to the cylindrical packer and thereafter to the piston packer.

7. A device for testing a tube having its end substantially flush with a tube sheet, comprising a mandrel adapted to have its end removably positioned in the tube, radially expansible packer sleeve means mounted about said mandrel end, annular piston packer means coaxial with said packer sleeve means mounted on said mandrel for axial motion with regard to said packer sleeve means, means for delivering a pressure fluid to the inside of said packer sleeve means, thereby expanding said packer sleeve means to form a seal within the tube, means for delivering a pressure fluid to one side of said piston packer means, thereby moving said piston packer means axially along said mandrel towards said packer sleeve means and into contact with the tube sheet to form an annular seal about the end of the tube, and means for applying a pressure fluid to the space confined by said two packer means.

8. For use in testing tubes, a device comprising a body member, a mandrel extending from said body, expansible packer means mounted on said mandrel, there being an annular recess in said body member about said mandrel, an annular piston fitted about said mandrel for sliding motion in pressure-tight contact with said mandrel and the walls of said recess, annular packer means carried by said piston, there being valved passage means in said body for delivering a pressure fluid to said first packer and to the space in said recess behind said piston and valved passage means for delivering a second pressure fluid to the space within said annular packer means, conduit means adapted to be connected to said body for supplying a pressure fluid to each of said first and second valved passage means, and gage means in communication with said second valved passage means for indicating the pressure of the fluid in said passage means.

RALPH G. STILLINGER.

REFERENCES CITED

The following references are of record in the file of this patent:

UNITED STATES PATENTS

| Number | Name | Date |
|---|---|---|
| 1,221,733 | Henderson | Apr. 3, 1917 |
| 1,604,012 | Bareiss | Oct. 19, 1926 |
| 1,613,150 | Zore | Jan. 4, 1927 |
| 2,196,317 | Longstreet | Apr. 9, 1940 |
| 2,216,268 | Fritsche | Oct. 1, 1940 |
| 2,342,616 | O'Brien | Feb. 22, 1944 |